May 29, 1956 P. P. REICHERTZ 2,748,290
MEASUREMENT OF WALL THICKNESS
Filed May 31, 1951 4 Sheets-Sheet 1

FIG. 1

INVENTOR.
PAUL P. REICHERTZ
BY
Frederick E. Dumoulin
ATTORNEY

May 29, 1956  P. P. REICHERTZ  2,748,290
MEASUREMENT OF WALL THICKNESS
Filed May 31, 1951  4 Sheets-Sheet 2

INVENTOR.
PAUL P. REICHERTZ
BY Frederick E. Dumoulin
ATTORNEY

May 29, 1956  P. P. REICHERTZ  2,748,290
MEASUREMENT OF WALL THICKNESS
Filed May 31, 1951  4 Sheets-Sheet 4

INVENTOR.
PAUL P. REICHERTZ
BY Frederick E. Dumoulin
ATTORNEY

United States Patent Office 2,748,290
Patented May 29, 1956

2,748,290

MEASUREMENT OF WALL THICKNESS

Paul P. Reichertz, Dallas, Tex., assignor, by mesne assignments, to Socony Mobil Oil Company, Inc., a corporation of New York Application May 31, 1951, Serial No. 229,209

9 Claims. (Cl. 250—83.6)

This invention relates to a method and apparatus for measuring the thickness of walls and relates more particularly to a method and apparatus employing penetrative radiation from a radioactive material for measuring the thickness of walls of pipes, tanks, and similar objects.

It is often necessary to measure the thickness of walls of such objects as pipes and tanks in order to determine, for example, characteristics or conditions of the objects such as structural strength or extent of corrosion. Where the pipe or tank or other object has an opening within the vicinity of the location where the measurement of wall thickness is to be made, the measurement usually can be made simply and accurately by means of calipers. However, in many instances, openings are not present or cannot be made in the wall in the vicinity of the location where the measurement is to be made and in these cases resort must be had to other means to measure the wall thickness. Heretofore, in these cases, among other methods, measurements of wall thickness have been made by placing a radioactive material along one side of the wall and measuring, by means of a radiation detector located at the same side of the wall, the scattered radiation. The scattered radiation is a function of the thickness of the wall and the type of material forming the wall, and by proper calibration, the thickness can be determined. However, in this method, it is necessary to know the exact composition of the material forming the wall or obtain samples of the material forming the wall, either of which may not be feasible, in order to obtain the calibration data for that type of material. Further, the material in contact with the opposite face of the wall affects the scattered radiation and therefore this factor must be taken into account when obtaining the calibration data or correction must be made therefor when applying the calibration data to the measured scattered radiation. Additionally, the radiation detector must be calibrated for each measurement of the scattered radiation in order to insure that the measured value of the intensity of the scattered radiation does not contain errors due to changes in the sensitivity, line voltage, or other factors affecting the operation of the instrument. Thus, when measuring the wall thickness of a pipe or tank by this method, it is necessary first to determine what is contained within the pipe or tank at the point of measurement, i. e., to determine what type of gas, liquid, or solid is contained within the pipe or tank at the point of measurement, second to obtain calibration data for the type of material forming the wall of the pipe or tank in contact with the material contained within the pipe or tank at the point of measurement, and third to calibrate the radiation detector.

It is an object of this invention to provide a method and apparatus for measuring the thickness of a wall. It is a more specific object of this invention to provide a method and apparatus for measuring the thickness of walls of closed pipes, tanks, and similar objects. It is another object of this invention to provide a method and apparatus for the measurement of the thickness of walls of pipes, tanks, and similar objects which do not require calibration data for the material forming the wall or the material in contact with the wall. It is another object of this invention to provide a method and apparatus for the measurement of the thickness of walls of pipes, tanks, and similar objects which are based upon the detection of relative values of penetrative radiation and do not require calibration of a radiation detecting instrument. It is another object of the invention to provide a method and apparatus for directly measuring the wall thickness of pipes, tanks, and similar objects. Further objects of the invention will become apparent from the following description thereof.

In accordance with the invention, penetrative radiation from a radioactive material is passed laterally through the wall of a pipe, tank, or similar object and the intensity of the radiation is measured at a plurality of points along a line the length of which between two points ascertainable by changes in the intensity of the radiation has a determinable mathematical relationship with the thickness of the wall. In a preferred embodiment of the invention, a source of penetrative radiation and a detector therefor are moved simultaneously along separate lines parallel to a perpendicular to the wall whose thickness is to be measured, the detector and source being moved for a measured distance extending exteriorly and interiorly of the wall, and the intensity of the radiation striking the detector measured as the source and detector are moved. In the preferred embodiment, the wall thickness is mathematically equal to the distance of movement of the detector between the two points ascertainable from the changes in the intensity of the radiation striking the detector as a result of the beam of radiation passing the exterior and interior surfaces of the wall.

In the practice of the invention, it is not necessary to measure the absolute values of the intensity of the penetrative radiation. It is only necessary to detect the changes in the intensity of the penetrative radiation. The measurement of the wall thickness being based upon relative values of the intensity of the penetrative radiation, calibration of the radiation detector need not be made for each measurement, although, of course, the sensitivity and other factors entering into the operation of the radiation detector should be substantially unchanged during each measurement of wall thickness to insure that changes in the intensity of the penetrative radiation indicated by the detector are not the result of changes in the factors entering into its operation. Additionally, the measurement of wall thickness being based upon relative values of the intensity of the penetrative radiation, calibration data for the material forming the wall or the material in contact with the wall is not required.

For a more detailed description of the invention reference is made to the accompanying drawings in which.

Figure 1:
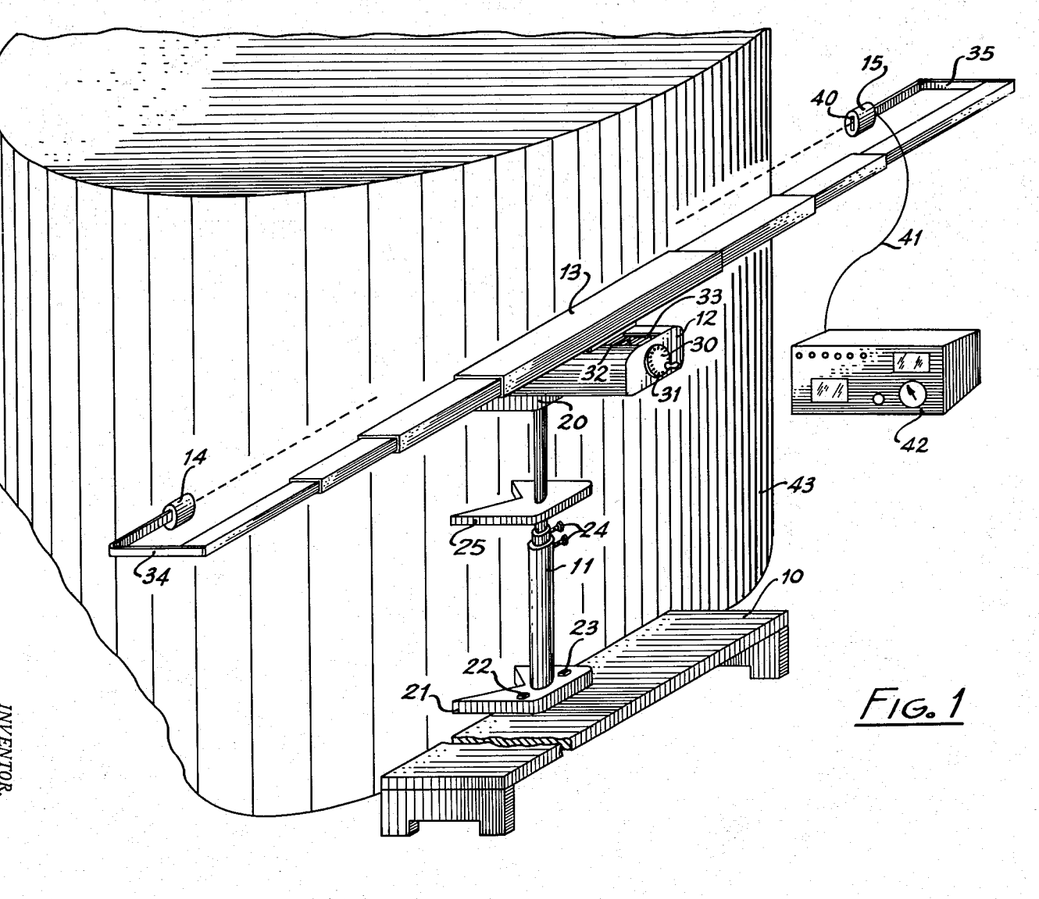
Figure 1 is a perspective view, partly cut away, of apparatus for measuring the thickness of a wall.

Referring now to Figure 1, a preferred embodiment of the apparatus comprises a base 10, a supporting rod 11, a gear box 12, and a telescopic arm 13 having at one end a chamber 14 containing a radioactive material and having at the other end a chamber 15 containing a detector for the penetrative radiation from the radioactive material. A platform 20 is attached to the rod 11 and the gear box 12 is attached to the platform. The base 10 is adapted to rest on the surface of the ground or flooring adjacent to the wall whose thickness is to be measured. Attached to the base is a wall contacting member 21. The wall contacting member 21 is attached to the base 10 by means of bolts 22 and 23 in order that the base may be removed from the remainder of the apparatus and rod 11 is fixedly connected to the member 21. The rod 11 is telescopic and is provided with set screws 24 for locking the rod at any desired elevation. Connected to the rod 11 is another wall contacting member 25 and the platform 20 is also shaped to form a wall contacting member. The wall contacting edges of the three members 20, 21, and 25 are equidistant at similar points from the axis of rod 11. The gear box 12 contains a suitable gear arrangement activated by crank 30 for movement of arm 13 laterally to the wall whose thickness is to be measured, i. e., to move arm 13 in the plane of a line between the source chamber 14 and the detector chamber 15, the plane forming a finite angle, preferably an angle of 90°, with the axis of the object whose wall thickness is to be measured. Crank 30 is provided with scale 31 for measurement of the linear distance of travel of the arm 13, each division on the scale corresponding to a known distance of travel of the arm as determined by the gear ratios. To prevent dust or other material from entering the gear box and interfering with easy operation of the crank 30 and travel of the arm 13, the gear box is provided with rubber bellows 32 within the travel channel 33.

Two perpendicularly extending arms 34 and 35 are connected at the ends of the arm 13. At the end of arm 34 is connected the chamber 14 made of a shielding material, such as lead, for the penetrative radiation. The radioactive material within the chamber may be a radioactive element or a radioactive salt. At the end of arm 35 is connected the detector chamber 15 for the penetrative radiation. Any suitable detector for the penetrative radiation may be employed such as a Geiger-Muller tube or a photoelectric scintillation tube. The detector chamber 15 is provided with a suitable aperture or collimating slit 40 for entrance of the penetrative radiation, and the chamber 14 is likewise provided with a similar aperture or collimating slit (not shown) for transmission of the penetrative radiation. Conductor cable 41 connects the detector with a conventional measuring device 42 for measuring the intensity of the penetrative radiation striking the detector.

Figure 2:
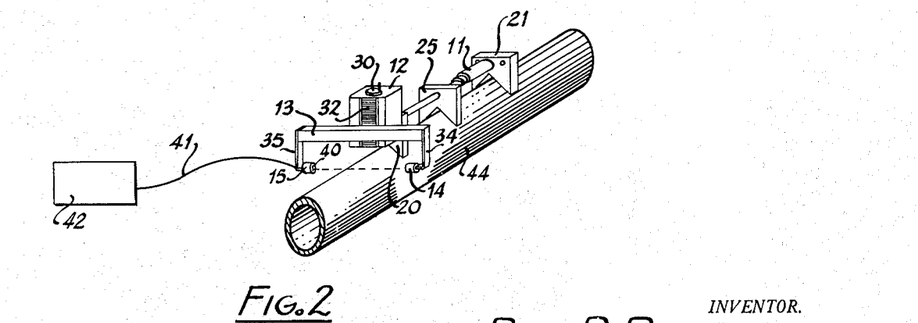
Figure 2 is a perspective view of the apparatus of Figure 1 positioned for measuring the wall thickness of a horizontal pipe.

For measuring the wall thickness of a cylindrical tank, the base 10 is rested upon the ground or flooring adjacent to the tank 43 and the wall contacting members 20, 21, and 25 preferably contact the wall of the tank, the arm 13 being preferably extended sufficiently so that the chambers 14 and 15 clear the walls of the tank. The apparatus is positioned similarly for measuring the wall thickness of a vertical pipe or similar object. For measuring the wall thickness of a horizontal tank or horizontal pipe, the apparatus is positioned as shown in Figure 2. The base 10 is disconnected from the wall contacting member 21 and the apparatus is placed upon the pipe or tank 44, the wall contacting members 20, 21, and 25 acting now as the base and resting upon the external wall of the pipe or tank, and the chambers 14 and 15 clearing the wall of the pipe or tank.

With the apparatus positioned adjacent the wall whose thickness is to be measured, the length of the telescopic arm 13 is adjusted so that the chambers 14 and 15 will be close together yet clear the wall of the pipe or tank upon lateral movement of the arm over the distance required. Preferably, the arm 13 is adjusted so that the chambers 14 and 15 are equidistant from the gear box although this is not essential. The crank 30 is actuated to move the arm outwardly to a position such that the penetrative radiation emitted from source chamber 14 and entering detector chamber 15 does not pass through the wall of the pipe or tank. This position is indicated schematically in Figure 3 by the line 50 representing the beam of penetrative radiation between the source chamber 14 and the detector chamber 15. With the arm in this position, the intensity of the penetrative radiation striking the detector is at a maximum since no portion of the pipe or tank protrudes upon the path of the beam of penetrative radiation between the source chamber 14 and the detector chamber 15. The intensity of the beam of penetrative radiation is then measured by means of the measuring device 42. The intensity of the penetrative radiation striking the detector with the arm in this position is represented by the point 50' in the graph of Figure 3, the abscissa of the graph representing the intensity of the radiation striking the detector and the ordinate representing the positions of the arm. The crank 30 is actuated to move the arm 13, and thus simultaneously move the source chamber 14 and the detector chamber 15 along lines parallel to each other, toward the point 51 on the exterior wall surface. The intensity of the penetrative radiation striking the detector is measured as the arm is moved toward the wall surface and the intensity will remain constant until after the beam has passed beyond the position indicated by the line 52. In the position indicated by the line 52, the intensity of the radiation striking the detector is represented by the point 52' on the graph. After the beam of penetrative radiation has passed beyond the position represented by the line 52, the wall of the pipe or tank protrudes into the path of the beam and thereby decreases the intensity of the beam striking the detector. The decrease in the intensity of the beam of penetrative radiation is indicated by the discontinuity in curve 53 of the graph at the point 52', i. e., is indicated by the slope of the curve changing from infinity to a finite value. At the first decrease in the intensity of the beam of penetrative radiation, the position of the arm, as shown by the reading on scale 31, is noted.

Figure 3:
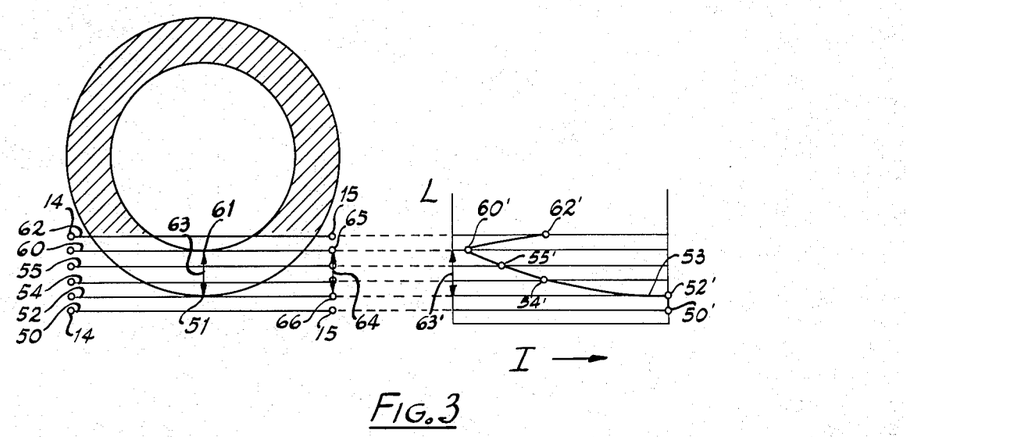
Figure 3 is a plan view in section of a cylindrical tank or pipe schematically illustrating a preferred method of measuring the wall thickness thereof and employing the apparatus of Figure 1.

As a movement of the arm 13 is continued, the beam of penetrative radiation passes through a greater distance of the material forming the wall of the pipe or tank before striking the detector, represented by lines 54, 55 and 60, and the intensity of the penetrative radiation striking the detector is correspondingly reduced, as represented by the points 54', 55', and 60'. When the beam of penetrative radiation is in the position represented by the line 60, passing through the point 61 on the interior wall of the pipe or tank, the intensity will be at a minimum. As the beam is moved beyond this position by movement of the arm, the intensity will begin to increase, as indicated by the discontinuity in the curve 53 at the point 60', since the distance the beam will travel through the material of the pipe or tank will decrease, as represented by the line 62, the point 62' on the graph representing the intensity of the radiation striking the detector at this position of the beam. At the first increase in the intensity of the radiation, i. e., the first change in the sign of the slope of the curve 53, the position of the arm, as shown by the reading on scale 31, is noted. The distance traveled by the arm between the position when the intensity of the radiation first starts to decrease (point 52') and the position when the intensity starts to increase after steadily decreasing (point 60') is the length of the line 63 between the points 51 and 61 or the thickness of the wall. The length of line 63' on the graph, also, is related by the graph scale to the thickness of the wall.

It will be observed that in measuring the thickness of the wall by this embodiment of the invention, the intensity of the transmitted radiation is measured along the line 64 between the points 65 and 66 which are ascertainable by changes in the intensity of the radiation and the length of the line between the points is equal to the thickness of the wall.

In the above description, as well as the descriptions appearing hereinafter, the assumption is made that the material contained within the pipe or tank has a lesser linear absorption coefficient for the penetrative radiation employed than the material forming the wall of the pipe or tank. This will be the case in most instances. However, it is possible that the material contained within the pipe or tank will have a greater linear absorption coefficient for the penetrative radiation employed than the material forming the wall of the pipe or tank and in these cases, the intensity of the beam of penetrative radiation will show a discontinuity in the direction of a decrease, rather than an increase, after passing through the position indicated by the line 60. In the other possible case, of course, where the material contained within the pipe or tank has the same linear absorption coefficient as the material forming the wall of the pipe or tank, it will be necessary to remove the material from the pipe or tank before making measurement of the wall thickness since no change in intensity will be observed when the beam passes through the position indicated by the line 60.

Figure 4:
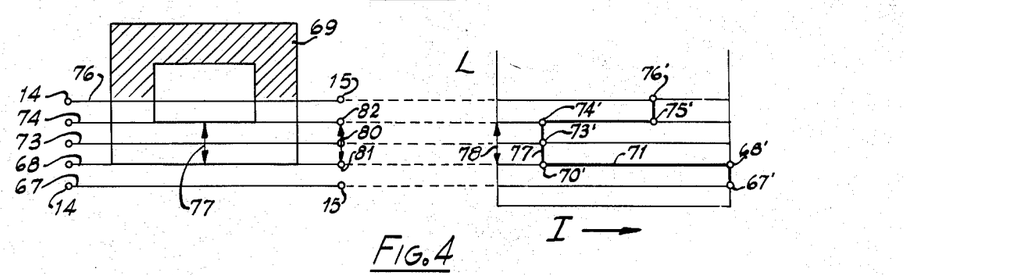
Figure 4 is a plan view in section of a rectangular tank schematically illustrating a preferred method of measuring the wall thickness thereof employing the apparatus of Figure 1.

Measurement of the thickness of a wall of a rectangular pipe, channel, tank, or similar object is made in a similar manner. Referring to Figure 4, the intensity of the radiation when the beam is in the position represented by the line 67 is at a maximum, as indicated on the graph by the point 67'. As the arm is moved inwardly, the intensity of the radiation remains constant up to the position of the beam adjacent to the wall represented by the line 68, the intensity being represented by the point 68' on the graph, after which the intensity drops immediately to a minimum by reason of passing through the entire length of the wall 69, as indicated by the discontinuity at the point 70' on the curve 71. At this point, the position of the arm, as shown by the reading on scale 31, is noted. As the arm is moved further inwardly through the positions represented by the lines 73 and 74, the intensity remains at the minimum, as represented by the points 73' and 74' on the graph, until the beam passes beyond the position represented by the line 74 adjacent to the interior surface of the wall whereupon the intensity of the radiation immediately increases as represented by the point 75', since the path of the beam is no longer obstructed by the entire length of the wall. The intensity will remain constant at this level should the beam be moved further inwardly to the position represented by the line 76, the intensity being represented by the point 76'. The position of the arm when the intensity of the radiation increases, as shown by the reading on the scale 31, is noted. The thickness of the wall is the length of the line 77 and is equal to the distance through which the arm is moved between the points where the radiation decreases (point 70') and where the radiation increases again (point 74'). The length of the line 78 on the graph, also, is related by the graph scale to the thickness of the wall. It will be observed that here, also, the intensity of the transmitted radiation is measured along the line 80 between the points 81 and 82 which are ascertainable by changes in the intensity of the radiation and the length of the line between the points is equal to the thickness of the wall.

Figure 5:
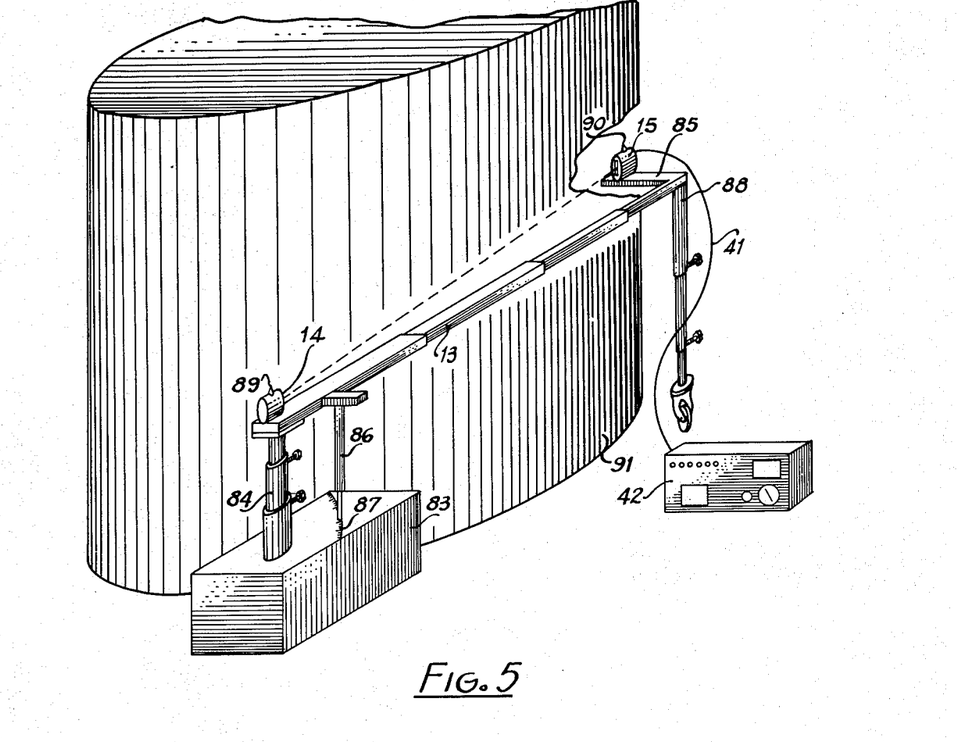
Figure 5 is a perspective view, partly cut away, of another embodiment of the apparatus for measuring thickness of a wall.

Referring to Figure 5, another embodiment of the apparatus for measuring the thickness of a wall comprises a base 83, a rotatable telescopic supporting rod 84 connected to the base 83, and a telescopic arm 13 connected to the rod 84 and having at one end a chamber 14 containing a radioactive material located directly over the axis of rotation of the rod 84 and having at the other end a perpendicularly extending arm 85 to which is connected a chamber 15 containing a detector for the penetrative radiation. A pointer 86 is attached to the arm 13 and the base 83 has a scale 87 to which the pointer 86 is directed whereby the angle through which the arm 13 is rotated can be measured. A wheeled, telescopic supporting arm 88 is preferably provided at the end of arm 13 containing detector chamber 15. A point indicator 89 is located on the chamber 14 marking the location of the source of penetrative radiation within the chamber 14 and a point indicator 90 is located on the chamber 15 marking the location of the detector within the chamber 15. A conductor cable 41 leads from the detector chamber 15 to a conventional measuring device 42 for measuring the intensity of the penetrative radiation striking the detector. The base 83 may be positioned, as shown, in the ground or flooring adjacent to a vertical object 91, which may be a pipe or tank, for measuring the wall thickness of the object. The base 83 may also be positioned on its side, on the ground or flooring adjacent to a horizontal pipe, tank, or similar object for measuring the wall thickness of the object.

Figure 6:
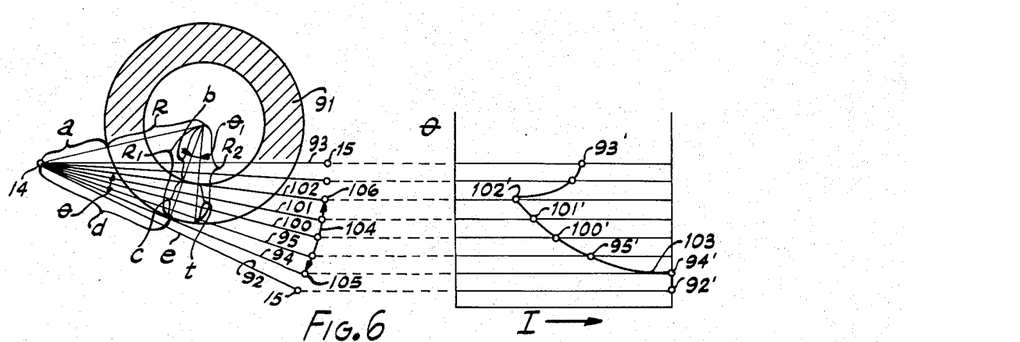
Figure 6 is a plan view in section of a cylindrical tank or pipe schematically illustrating an embodiment of the method of measuring the wall thickness thereof and employing the apparatus of Figure 5.

For measurement of wall thickness of a cylindrical object with this embodiment of the apparatus, the apparatus, referring to Figure 6, is placed adjacent to the object 91, the line 92 representing the beam of penetrative radiation between the source chamber 14 and the detector chamber 15. The length of the telescopic arm 13 is adjusted such that the arm may be rotated to bring the detector chamber 15 around the object 91 a sufficient distance to pass the penetrative radiation from the source to the detector through a plane which includes the inner open space of the object, as exemplified by the line 93 representing the beam of penetrative radiation. With the beam of penetrative radiation in the position represented by the line 92, the intensity of the radiation striking the detector is measured. At this position, the intensity is at a maximum, indicated by the point 92' on the graph. The arm is then rotated, i. e., the arm is moved in the plane of a line between the source chamber and the detector chamber, the plane forming a finite angle, preferably an angle of 90°, with the axis of the object 91 whose wall thickness is being measured. As the arm is rotated in the plane, the intensity of the radiation striking the detector is measured. The intensity of the radiation striking the detector will remain at the maximum until the beam passes beyond the position represented by the line 94, the intensity at this position of the beam being represented by the point 94', after which the intensity will begin to decrease because of protrusion of the material of the wall of the object 91 into the beam. The intensity of the radiation striking the detector will continue to decrease through the positions represented by the lines 95, 100, 101, and 102, the intensities being represented by the points 95', 100', 101', and 102' on the graph. After the beam has passed through the position represented by the line 102, i. e., the line touching the inner wall of the object 91, the intensity will begin to increase since a lesser amount of the material of the wall will protrude into the path of the beam. The position of the pointer 86 on the scale 87 is noted when the intensity of the radiation first begins to decrease, i. e., the discontinuity in the line 103 on the graph at the point 94' where the slope of the curve changes from infinity to a finite value, and the position of the pointer is again noted when the intensity begins to increase, i. e., the discontinuity in the line 103 or the change in the sign of the slope of the line 103, at the point 102'. The angle of rotation of the arm between these two positions is thus obtained. The circumference of the object 91 and the distance between the point indicator 89 and the nearest point on the exterior wall of the object 91 are then measured.

The thickness of the wall of object 91 can be calculated from the angle through which the arm is rotated between the positions of the beam represented by the lines 94 and 102, i. e., the positions at which the intensity of the radiation decreases from a maximum and when it begins to increase after previously decreasing, and from the outer radius of the object 91 which may be measured directly or determined from the circumference as measured employing the relation $R=C/2\pi$, where R is the outer radius and C is the circumference. Still referring to Figure 6, $\theta$ is the angle through which the arm 13 is rotated between the positions of the beam represented by the lines 94 and 102, $a$ is the distance between the point indicator 90 and the nearest point on the exterior wall of the object 91, R, $R_1$ and $R_2$ are radii of the object 91, and $t$ is the thickness of the wall of the object 91. An expression for the thickness $t$ is derived as follows:

1. $\quad d=\sqrt{(R+a)^2-R_1^2}$
2. $\quad c=d \cot \theta$
3. $\quad c=\sqrt{(R+a)^2-R_1^2} \cot \theta$
4. $\quad b=R_1-c$
5. $\quad b=R_1-\sqrt{(R+a)^2-R_1^2} \cot \theta$
6. $\quad \theta=\theta_1$
7. $\quad (R_2-t)=b \cos \theta$
8. $\quad R_2-t=(R_1-\sqrt{(R+a)^2-R_1^2} \cot \theta) \cos \theta$
9. $\quad t=R_2-(R_1-\sqrt{(R+a)^2-R_1^2} \cot \theta) \cos \theta$
10. $\quad R=R_1=R_2$
11. $\quad t=R-(R-\sqrt{(R+a)^2-R^2} \cot \theta) \cos \theta$ In measuring the thickness of a wall of a cylindrical object by this embodiment of the invention, the intensity of the transmitted radiation is measured along the line 104 between the points 105 and 106, which points are ascertainable by changes in the intensity of the radiation. The line 104 between the points 105 and 106 is an arc subtending the angle $\theta$ and it length $l$ is equal to $\theta e$, where $e$ is the distance between the source 14 and the detector 15. Therefore, $\theta=l/e$ and $l/e$ can be substituted in Equation 9 above to give the mathematical relationship of the length of the line 104 between the points 105 and 106 with the thickness $t$ of the wall.

Figure 7:
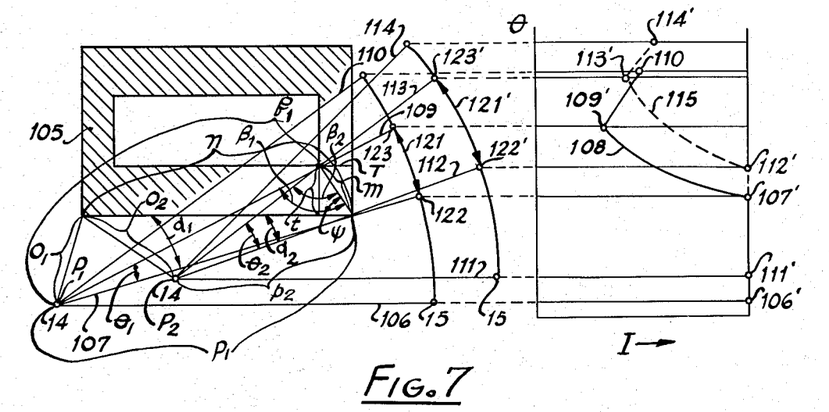
Figure 7 is a plan view in section of a rectangular tank schematically illustrating an embodiment of the method of measuring the wall thickness thereof and employing the apparatus of Figure 5.

Measurement of the thickness of a wall of a rectangular pipe, channel, tank, or similar object is made in a somewhat similar manner. Referring to Figure 7, the apparatus is placed adjacent to the object 105 having wall thicknesses $t$ and T in any position such that the beam of radiation passing between the source chamber 14 and the detector chamber 15 upon rotation of the arm will sweep a corner of the object from the exterior corner to the interior corner. Assuming the apparatus to be placed so that the source chamber 14 is at position $P_1$, the intensity of the radiation striking the detector when the beam is in the position represented by the line 106 is at a maximum, as represented on the graph by the point 106'. As the arm is rotated, the intensity of the radiation remains constant until the beam has passed beyond the position represented by the line 107, the intensity being represented on the graph by the point 107', whereupon the intensity begins the decrease because of passage through the wall of the object 105, as represented by the discontinuity beyond the point 107' on the curve 108. At this point, the position of the arm, as indicated by the pointer 86 on the scale 87, is noted. As the arm is rotated approaching the position represented by line 109, the intensity continues to decrease until the beam reaches the position represented by line 109, in which position the intensity is at a minimum. The intensity at this position is represented by the point 109' on the graph. As the arm is further rotated to a position such as that represented by line 110, the intensity begins to increase since the path of the beam passes through a shorter length of the wall. The intensity of the beam in the position represented by line 110 is represented by point 110' on the graph. The position of the arm as shown by the pointer 86 on scale 87, when the intensity of the radiation begins to increase, i. e., point 109', is noted. The angle of rotation, $\theta_1$ of the arm between the positions when the radiation begins to decrease and when it begins to increase is thus obtained.

The length $n$ of the wall, the distance $o_1$ from the source chamber 14 to the near corner of the wall, and the distance $p_1$ from the source chamber 14 to the far corner of the wall are measured.

An expression for the thickness $t$ is derived as follows: In the triangle having the sides $p_1 o_1 n$, 12. $\quad o_1^2 = p_1^2 + n^2 - 2 p_1 n \cos \alpha_1$ 13. $\quad \cos \alpha_1 = \dfrac{p_1^2 + n^2 - o_1^2}{2 p_1 n}$ 14. $\quad \alpha_1 = \cos^{-1} \dfrac{(p_1^2 + n^2 - o_1^2)}{2 p_1 n}$ In the triangle having the sides $p_1 m_1 q_1$, 15. $\quad B_1 = 180° - (\theta_1 + \alpha_1 + \psi)$ 16. $\quad \dfrac{m_1}{\sin \theta_1} = \dfrac{p_1}{\sin B_1}$ 17. $\quad m_1 = p_1 \dfrac{\sin \theta_1}{\sin B_1}$ 18. $\quad t = m_1 \cos \psi$ 19. $\quad t = \left( p_1 \dfrac{\sin \theta_1}{\sin B_1} \right) \cos \psi$ 20. $\quad t = \left[ p_1 \dfrac{\sin \theta_1}{\sin [180° - (\theta_1 + \alpha_1 + \psi)]} \right] \cos \psi$ 21. $\quad t = \left\{ \dfrac{p_1 \sin \theta_1}{\sin \left[ 180° - \left( \theta_1 + \cos^{-1}\left\{\dfrac{p_1^2 + n^2 - o_1^2}{2 p_1 n}\right\} + \psi \right)\right]} \right\} \cos \psi$ In the special case where the thicknesses of both walls of object 105 are known to be equal, i. e., $t=T$, the angle $\psi$ will be 45° and Equation 21 can be solved directly for $t$.

Where the relationship between the thicknesses $t$ and T are not known, Equation 21 will contain two unknowns, namely, $t$ and $\psi$, and the equation cannot be solved directly for $t$. In this case, it is necessary to repeat the above described rotation of the arm with the source chamber 14 at another position in order to eliminate one unknown from Equation 21 by employing simultaneous equations. The apparatus is moved to another position adjacent to the object 105, for example, to a position where the source chamber 14 will be at position $P_2$. The arm is rotated and measurements of the intensity of the radiation striking the detector are similarly as above. The positions of the beam of penetrative radiation represented by lines 111, 112, 113, and 114 correspond to the positions of the beam represented by the lines 106, 107, 109, and 110 and the points 111', 112', 113', and 114' on the graph correspond to points 106', 107', 109', and 110'. The line 115 on the graph represents the intensities of the beam of radiation striking the detector as the arm is rotated with source chamber 14 at position $P_2$. The distance $o_2$ from the source chamber 14 to the near corner of the wall and the distance $p_2$ from the source chamber 14 to the far corner of the wall are measured. The thickness t is now given by the equation:

22. $\quad t = \left\{ \dfrac{p_2 \sin \theta_2}{\sin \left[ 180° - \left( \theta_2 + \cos^{-1}\left\{\dfrac{p_2^2 + n^2 - o_2^2}{2 p_2 n}\right\} + \psi \right)\right]} \right\} \cos \psi$ From Equations 21 and 22, $t$ can be determined. Further, $T$ can be determined since 23.     $T = t \cot \psi$ The intensity of the radiation is measured along the lines 121 and 121' which are arcs subtending the angles $\theta_1$ and $\theta_2$ and have lengths $l$ equal to $\theta e$, where $e$ is the distance between the source chamber 14 and the detector chamber 15. Therefore, $\theta = l/e$ and $l/e$ can be substituted in Equations 20 and 21 above to give the mathematical relationship of the length of the lines 121 and 121' between the points 122 and 123 and the points 122' and 123' with the thickness $t$ of the wall.

Figure 8:
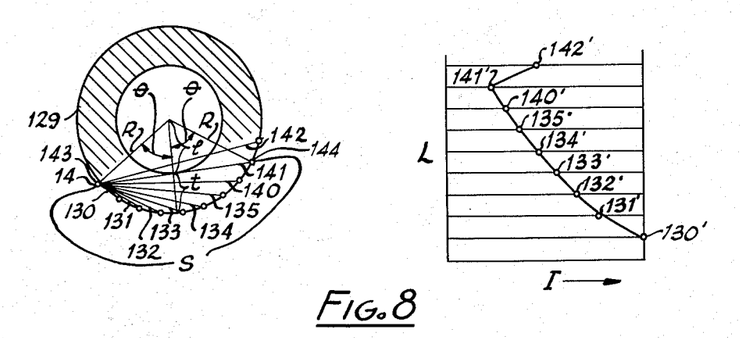
Figure 8 is a plan view in section of a cylindrical tank or pipe schematically illustrating another embodiment of the method of measuring the wall thickness thereof.
Figure 9:
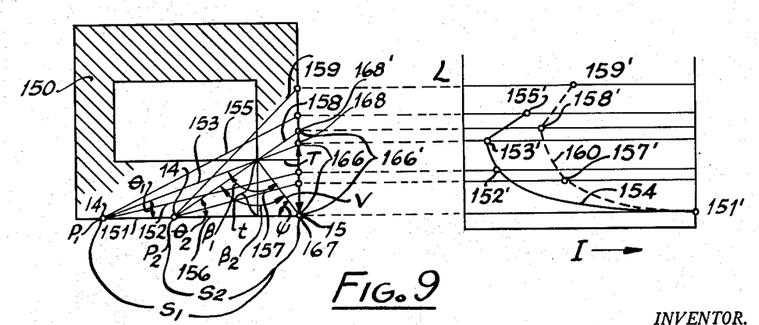
Figure 9 is a plan view in section of a rectangular tank schematically illustrating an embodiment of the method of measuring the wall thickness thereof.

Figures 8 and 9 illustrate a further embodiment of the method of measuring wall thickness wherein the apparatus of Figure 5 is employed. Referring to Figure 8, the apparatus is positioned adjacent to the wall 129 with the telescopic arm closed to its shortest length, the chambers 14 and 15 both lying adjacent to the wall and the beam of penetrative radiation not passing through any portion of the wall. With the source and the detector in this position, the path of the beam of penetrative radiation being represented by the line 130, the intensity of the radiation is measured. The intensity of the radiation with the source chamber and the detector chamber in this position will be at a maximum and is represented by the point 130' on the graph. The telescopic arm is then opened somewhat and the arm is rotated so that the detector chamber is as close to the wall as possible and the beam of penetrative radiation passes through a portion of the wall 129. With the source chamber and the detector chamber in this position, the beam of penetrative radiation being represented by line 131, the intensity of the beam of penetrative radiation striking the detector is measured. The intensity of the beam in this position is represented on the graph by the point 131'. The procedure is repeated with the telescopic arm being gradually increased in length, the beam of penetrative radiation between the source chamber and the detector chamber at various lengths of the arm and relative position of the source and detector chambers being represented by lines 132, 133, 134, 135, 140, 141, and 142. Depending upon the size of the object whose wall thickness is being measured, the arm 85 may be of various lengths as required. The intensity of the beam of radiation striking the detector at these various lengths of the arm and relative positions of the source and detector chambers is represented by the points 132', 133', 134', 135', 140', 141', and 142' on the graph. As the length of the arm is increased and the detector chamber is moved around the circumference of the wall 129, the intensity of the radiation gradually decreases as a result of passage through greater lengths of the wall 129 until the beam of penetrative radiation passes through the position represented by the line 141. After passing through the position represented by the line 141, the intensity begins to increase since the beam passes through shorter lengths of the wall. The position of the detector chamber 15 relative to the source chamber 14 at the point where the intensity of the radiation begins to increase (point 141') after the previous decrease (point 130') is noted and the distance between the chambers 14 and 15 along the perimeter of the wall is measured. This distance is represented as $s$ in Figure 8. The outer radius R of the tank or pipe is measured by measuring the circumference or the diameter and employing the expressions $$R = \frac{C}{2\pi}$$

where $C$ is the circumference, or $$R = \frac{D}{2}$$

where $D$ is the diameter.

An expression for the thickness $t$ of the wall is derived as follows:

24.     $\theta = \dfrac{s}{2R}$

25.     $\cos \theta = \dfrac{l}{R}$

26.     $l = R \cos \theta$

27.     $t = R - l$

28.     $t = R - R \cos \theta$

In this embodiment of the invention, the intensity of the radiation is measured along the line $s$ between the points 143 and 144 and the length of the line between these points is mathematically related to the thickness $t$ as follows:

29.     $\theta = s/2R$

30.     $t = R - R \cos \theta$

31.     $t = \dfrac{s}{2\theta} - \dfrac{s}{2\theta} \cos \theta$

Figure 9 schematically illustrates measurement of the wall thickness of a rectangular object employing the same method as above. The chamber 14 is positioned adjacent to the wall of the object 150 at position $P_1$ and the detector chamber 15 is positioned against the corner of the wall. The beam of penetrative radiation in this position is represented by the line 151 and the intensity of the radiation is represented by the point 151' on the graph. The detector chamber is then moved to various positions along the surface of the side wall of the object 150 and the intensity of the radiation is measured at these positions. As the detector chamber is moved along the wall, the beam of penetrating radiation striking the detector decreases in intensity as a result of passing through greater lengths of the wall, the beam of penetrating radiation being represented by the lines 152 and 153 and the intensity being represented by the points 152' and 153' on the line 154 on the graph. After the beam of penetrating radiation has passed through the position represented by the line 153, i. e., approaches the position represented by the line 155, the intensity increases, such as the intensity indicated by the point 155' on the graph, since the beam passes through decreasing lengths of the wall. The positions of the arm at the point 151' where the intensity begins to decrease and at the point 153' where it begins to increase after its previous decrease are noted and the angle of rotation $\theta$ of the arm between these points is measured. The distance $s_1$ between the source chamber 14 and the corner of the wall is measured.

An expression for the thickness $t$ of the wall is derived as follows:

In the triangle having the sides $s_1$, $u$, $v$,

32.     $B_1 = 180° - (\psi + \theta)$

33.     $\dfrac{s_1}{\sin B_1} = \dfrac{v}{\sin \theta_1}$

34.     $v = s_1 \dfrac{\sin \theta_1}{\sin B_1}$

35.     $t = v \cos \psi$

36.     $t = s_1 \dfrac{\sin \theta_1}{\sin B_1} \cos \psi$

37.     $t = \dfrac{s_1 \sin \theta_1 \cos \psi}{\sin [180° - (\psi + \theta_1)]}$ Similiar to the embodiment described in connection with Figure 7, in the special case where the thicknesses of both walls of object 150 are known beforehand to be equal, i. e., $t = T$, the angle $\psi$ will be 45° and Equation 37 can be solved directly for $t$.

Where the relationship between the thicknesses $t$ and $T$ are not known, Equation 37 will contain two unknowns. By repeating the above described procedure with the source chamber 14 at another position, such as position $P_2$, another equation containing $t$ and $\psi$ can be obtained and the values of $t$ and $\psi$ determined from the simultaneous equations. The positions of the beam of penetrative radiation represented by lines 156, 157, 158, and 159 correspond to the positions of the beam represented by the lines 151, 152, 153, and 155 and the points 157', 158', and 159' on the line 160 on the graph correspond generally to the points 152', 153', and 155' on the line 154, point 151' being the same whether the source chamber is at position P₁ or position P₂. The distance $s_2$ between the source chamber 14 and the corner of the wall is measured. The expression for the thickness $t$ will now be:

38. $$t = \frac{s_2 \sin \theta_1 \cos \psi}{\sin [180° - (\psi + \theta_2)]}$$

From Equations 20 and 21, $t$ can be determined. Further $T$ can be determined from Equation 22.

The intensity of the radiation is measured along the lines 166 and 166' between the points 167 and 168 and 167 and 168' respectively and the length is equal to $s_1 \tan \theta_1$, or $s_2 \tan \theta_2$. Accordingly, $s_1$ or $s_2$ is equal to the quotient of the length of the line 166 or 166' divided by $\tan \theta_1$ or $\tan \theta_2$ which may be substituted in Equations 35 or 36 to give the mathematical relationship between the length of the lines 166 and 166' between the points 167 and 168 and 167 and 168' and the thickness $t$ of the wall.

Various modifications may be made in the apparatus and methods hereinabove described without departing from the spirit of the invention. For example, the positions of the source chamber 14 and the detector chamber 15 may be reversed. Further, mathematical relationships involving the thickness other than those given may be derived and mathematical relationships for the thickness of walls of other shaped objects may be derived.

Having thus described my invention, it will be understood that such description has been given by way of illustration and example and not by way of limitation, reference for the latter purpose being had to the appended claims.

I claim:

1. Apparatus for use in measuring the thickness of a wall comprising in combination a base, an arm support attached to said base, a telescopic arm attached to said support, a source of penetrative radiation mounted at one end of said arm, a detector for said penetrative radiation mounted at the other end of said arm, and means for rotating said arm through a measurable angle in the plane of a straight line between said source of penetrative radiation and said detector for said penetrative radiation.

2. Apparatus for use in measuring the thickness of a wall comprising in combination a base, a rod attached at one end to said base, a telescopic arm attached at one end thereof to the other end of said rod, a source of penetrative radiation mounted at one end of said arm over the axis of said rod, a detector for said penetrative radiation mounted at the other end of said arm, and means for rotating said arm through a measurable angle about said rod.

3. In a method of measuring the thickness of a wall of a polygonal object, said wall having another wall of unequal thickness connected at an angle thereto, the steps comprising positioning a source of penetrative radiation and a detector therefor exteriorly of said wall, maintaining a beam of penetrative radiation between said source and said detector, moving either of said source and said detector while maintaining the other stationary at a first location so that said beam of penetrative radiation passing between said source and said detector describes a first plurality of paths at least one of which paths avoids said wall but passes through a point located just outside the outer surface of said wall and one other of which paths passes through a point located just outside the inner surface of said wall and so that either of said source and said detector follows a line the length of which between two points ascertainable from variations in the intensity of said beam of penetrative radiation striking said detector has a determinable mathematical relationship with the thickness of said wall in terms of the thickness of said other wall connected thereto, measuring at a plurality of points the intensity of said beam of penetrative radiation striking said detector to detect said two points on said line as said beam of penetrative radiation between said source and said detector describes said first plurality of paths, repositioning said source and said detector exteriorly of said wall, maintaining a beam of penetrative radiation between said source and said detector, moving either of said source and said detector while maintaining the other stationary at a second location so that said beam of penetrative radiation passing between said source and said detector describes a second plurality of paths at least one of which paths avoids said wall but passes through a point located just outside the outer surface of said wall and one other of which paths passes through a point located just outside the inner surface of said wall and so that either of said source and said detector follows a line the length of which between two points ascertainable from variations in the intensity of said beam of penetrative radiation striking said detector also has a determinable mathematical relationship with the thickness of said wall in terms of the thickness of said other wall connected thereto, and measuring at a plurality of points the intensity of said radiation striking said detector to detect said two points on said line as said beam of penetrative radiation between said source and said detector describes said second plurality of paths.

4. In a method of measuring the thickness of a wall of a polygonal object, said wall having another wall of unequal thickness connected at an angle thereto, the steps comprising positioning a source of penetrative radiation and a detector therefor exteriorly of said wall, maintaining a beam of penetrative radiation between said source and said detector, moving said detector while maintaining said source stationary at a first location so that said beam of penetrative radiation passing between said source and said detector describes a first plurality of paths at least one of which paths avoids said wall but passes through a point located just outside the outer surface of said wall and one other of which paths passes through a point located just outside the inner surface of said wall and so that said detector follows a line the length of which between two points ascertainable from variations in the intensity of said beam of penetrative radiation striking said detector has a determinable mathematical relationship with the thickness of said wall in terms of the thickness of said other wall connected thereto, measuring at a plurality of points the intensity of said beam of penetrative radiation striking said detector to detect said two points on said line as said beam of penetrative radiation between said source and said detector describes said first plurality of paths, changing the position of said source from said first location to a second location, maintaining a beam of penetrative radiation between said source and said detector, moving said detector while maintaining said source stationary at its said second location so that said penetrative radiation passing between said source and said detector describes a second plurality of paths at least one of which paths avoids said wall but passes through a point located just outside the outer surface of said wall and one other of which paths passes through a point located just outside the inner surface of said wall and so that said detector follows a line the length of which between two points ascertainable from variations in the intensity of said penetrative radiation striking said detector also has a determinable mathematical relationship with the thickness of said wall in terms of the thickness of said other wall connected thereto, and measuring at a plurality of points the intensity of said radiation striking said detector to detect said two points on said line as said beam of penetrative radiation between said source and said detector describes said second plurality of paths.

5. In a method of measuring the thickness of a wall of a polygonal object, said wall having another wall of unequal thickness connected at an angle thereto, the steps comprising positioning and maintaining stationary at a fixed first location either of a source of penetrative radiation and a detector for penetrative radiation against the exterior surface of said wall, positioning the other of said source and said detector against the exterior surface of said other wall, maintaining a beam of penetrative radiation between said source and said detector, moving the other of said source and said detector laterally along the exterior surface of said other wall so that said beam of penetrative radiation passing between said source and said detector describes a first plurality of paths at least one of which paths avoids said wall but passes through a point located just outside the outer surface of said wall and one other of which paths passes through said wall and through a point located just outside the inner surface of said wall, measuring at a plurality of points the intensity of said beam of penetrative radiation striking said detector as said other of said source and said detector is moved to detect two points along the exterior surface of said other wall ascertainable from changes in the intensity of said beam of penetrative radiation striking said detector the distance between which is mathematically related to the thickness of said wall in terms of the thickness of said other wall, changing the position of either of said source and said detector from its said fixed first location to a second fixed location against the exterior surface of said wall, maintaining a beam of penetrative radiation between said source and said detector, moving the other of said source and said detector laterally along the exterior surface of said other wall so that said beam of penetrative radiation passing between said source and said detector describes a second plurality of paths at least one of which paths avoids said wall but passes through a point located just outside the outer surface of said wall and the other of which passes through said wall and through a point located just outside the inner surface of said wall, and measuring at a plurality of points the intensity of said beam of penetrative radiation striking said detector as said other of said source and said detector is moved to detect two points along the exterior surface of said other wall ascertainable from changes in the intensity of said beam of penetrative radiation striking said detector the distance between which is also mathematically related to the thickness of said wall in terms of the thickness of said other wall.

6. In a method of measuring the thickness of wall of a polygonal object, said wall having another wall of unequal thickness connected at an angle thereto, the steps comprising positioning a source of penetrative radiation against the exterior surface of said wall, positioning a detector for said penetrative radiation against the exterior surface of said other wall, maintaining a beam of penetrative radiation between said source and said detector, moving said detector laterally along the exterior surface of said other wall while maintaining said source stationary at a fixed first location so that said beam of penetrative radiation passing between said source and said detector describes a first plurality of paths at least one of which paths avoids said wall but passes through a point located just outside the outer surface of said wall and one other of which paths passes through said wall and through a point located just outside the inner surface of said wall, measuring at a plurality of points the intensity of said beam of penetrative radiation striking said detector as said detector is moved to detect two points along the exterior surface of said other wall ascertainable from changes in the intensity of said beam of penetrative radiation striking said detector the distance between which is mathematically related to the thickness of said wall in terms of the thickness of said other wall, changing the position of said source from its said fixed first location to a fixed second location against the exterior surface of said wall, maintaining a beam of penetrative radiation between said source and said detector, moving said detector laterally along the exterior surface of said other wall while maintaining said source stationary at its said fixed second location so that said beam of penetrative radiation passing between said source and said detector describes a second plurality of paths at least one of which paths avoids said wall but passes through a point located just outside the outer surface of said wall and the other of which paths passes through said wall and through a point located just outside the inner surface of said wall, and measuring at a plurality of points the intensity of said beam of penetrative radiation striking said detector as said detector is moved to detect two points along the exterior surface of said other wall ascertainable from changes in the intensity of said beam of penetrative radiation striking said detector the distance between which is also mathematically related to the thickness of said wall in terms of the thickness of said other wall.

7. Apparatus for use in measuring the thickness of a wall comprising in combination a base, an arm support attached to said base, an arm attached perpendicularly at one end thereof to said arm support, a second arm attached perpendicularly to said first mentioned arm at its other end thereof, a source of penetrative radiation mounted on said arm over the axis of said arm support, a detector for said penetrative radiation mounted on said second arm, and means whereby said arm may be rotated through a measurable angle in a plane perpendicular to said arm support.

8. In a method of measuring the thickness of a wall of a polygonal object, said wall having another wall connected at an angle thereto, the steps comprising positioning a source of penetrative radiation and a detector therefor exteriorly of said wall, maintaining a beam of penetrative radiation between said source and said detector, moving either of said source and said detector while maintaining the other stationary at a first location so that said beam of penetrative radiation passing between said source and said detector describes a first plurality of paths at least one of which paths avoids said wall but passes through a point located just outside the outer surface of said wall and one other of which paths passes through a point located just outside the inner surface of said wall and so that either of said source and said detector follows a line the length of which between two points ascertainable from variations in the intensity of said beam of penetrative radiation striking said detector has a determinable mathematical relationship with the thickness of said wall in terms of the thickness of said other wall connected thereto, measuring at a plurality of points the intensity of said beam of penetrative radiation striking said detector to detect said two points on said line as said beam of penetrative radiation between said source and said detector describes said first plurality of paths, repositioning said source and said detector exteriorly of said wall, maintaining a beam of penetrative radiation between said source and said detector, moving either of said source and said detector while maintaining the other stationary at a second location so that said beam of penetrative radiation passing between said source and said detector describes a second plurality of paths at least one of which paths avoids said wall but passes through a point located just outside the outer surface of said wall and one other of which paths passes through a point located just outside the inner surface of said wall and so that either of said source and said detector follows a line the length of which between two points ascertainable from variations in the intensity of said beam of penetrative radiation striking said detector also has a determinable mathematical relationship with the thickness of said wall in terms of the thickness of said other wall connected thereto, and measuring at a plurality of points the intensity of said radiation striking said detector to detect said two points on said line as said beam of penetrative radiation between said source and said detector describes said second plurality of paths.

9. In a method of measuring the thickness of a wall of a polygonal object, said wall having another wall connected at an angle thereto, the steps comprising positioning a source of penetrative radiation and a detector therefor exteriorly of said wall, maintaining a beam of penetrative radiation between said source and said detector, moving said detector while maintaining said source stationary at a first location so that said beam of penetrative radiation passing between said source and said detector describes a first plurality of paths at least one of which paths avoids said wall but passes through a point located just outside the outer surface of said wall and one other of which paths passes through a point located just outside the inner surface of said wall and so that said detector follows a line the length of which between two points ascertainable from variations in the intensity of said beam of penetrative radiation striking said detector has a determinable mathematical relationship with the thickness of said wall in terms of the thickness of said other wall connected thereto, measuring at a plurality of points the intensity of said beam of penetrative radiation striking said detector to detect said two points on said line as said beam of penetrative radiation between said source and said detector describes said first plurality of paths, changing the position of said source from said first location to a second location, maintaining a beam of penetrative radiation between said source and said detector, moving said detector while maintaining said source stationary at its said second location so that said penetrative radiation passing between said source and said detector describes a second plurality of paths at least one of which paths avoids said wall but passes through a point located just outside the outer surface of said wall and one other of which paths passes through a point located just outside the inner surface of said wall and so that said detector follows a line the length of which between two points ascertainable from variations in the intensity of said penetrative radiation striking said detector also has a determinable mathematical relationship with the thickness of said wall in terms of the thickness of said other wall connected thereto, and measuring at a plurality of points the intensity of said radiation striking said detector to detect said two points on said line as said beam of penetrative radiation between said source and said detector describes said second plurality of paths.

References Cited in the file of this patent

UNITED STATES PATENTS

| Number | Name | Date |
|---|---|---|
| 2,349,429 | Herzog et al. | May 23, 1944 |
| 2,370,163 | Hare | Feb. 27, 1945 |
| 2,462,088 | Friedman | Feb. 22, 1949 |
| 2,486,902 | Wolf | Nov. 1, 1949 |
| 2,501,174 | Herzog | Mar. 21, 1950 |
| 2,536,131 | Herzog | Jan. 2, 1951 |
| 2,540,261 | Herzog | Feb. 6, 1951 |